United States Patent [19]

Germain et al.

[11] Patent Number: 5,464,968
[45] Date of Patent: Nov. 7, 1995

[54] DEVICE FOR THE CONTROL AND DETECTION OF ADEQUATE HEAT LEVELS IN MICROWAVE OVENS

[75] Inventors: Alain Germain, Bagneux; Andre-Jean Berteaud, Draveil; Francois Galtier, Paris, all of France

[73] Assignees: Microondes Energie Systemes, Fresnes; Solufrance, Paris, both of France

[21] Appl. No.: 85,397

[22] Filed: Jun. 30, 1993

[30] Foreign Application Priority Data

Jul. 2, 1992 [FR] France ................................. 9208175

[51] Int. Cl.$^6$ ....................................... H05B 6/68
[52] U.S. Cl. ...................... 219/710; 219/730; 219/759; 219/720; 116/207; 422/21; 426/88; 426/243; 374/149; 99/DIG. 14
[58] Field of Search ................................ 219/710, 730, 219/732, 733, 734, 735, 759, 720; 116/207, 216; 422/21; 426/88, 241, 243, 234; 374/174, 186, 149, 150, 157; 99/DIG. 14, 325

[56] References Cited

U.S. PATENT DOCUMENTS

| 3,617,374 | 11/1971 | Hodson et al. ......................... 428/1 |
| 3,968,056 | 7/1976 | Bolon et al. ............................. 252/514 |
| 4,696,580 | 9/1987 | Kameda ................................. 374/162 |
| 4,786,773 | 11/1988 | Keefer ............................... 219/10.55 E |
| 4,870,234 | 9/1989 | Steers et al. ........................... 219/710 |
| 4,871,891 | 10/1989 | Steers et al. ........................... 219/710 |
| 4,914,266 | 4/1990 | Parks et al. ............................. 219/730 |
| 4,933,525 | 6/1990 | St. Phillips ............................. 219/725 |
| 5,057,434 | 10/1991 | Prusik et al. ........................... 116/207 |

FOREIGN PATENT DOCUMENTS

| 1043676 | 12/1978 | Canada ..................................... 150/1 |
| 0054831 | 6/1982 | European Pat. Off. ......... G01K 3/04 |
| 1292900 | 3/1962 | France . |
| 1597078 | 9/1981 | United Kingdom ........... G01K 17/06 |

Primary Examiner—Philip H. Leung
Attorney, Agent, or Firm—Frederick H. Rabin; J. David Dainow

[57] ABSTRACT

A process for controlling the microwave heating of a product to a temperature which is higher than or equal to a determined temperature for a period which is longer than or equal to a determined period, a marking support and a receptacle for product intended for such a control. Measurement is made of the resistivity of a thermally crosslinkable ink filled with conductive particles, with which the product or the receptacle containing the product has been previously marked and the resistivity of which is arranged to decrease in a predetermined manner in relation to the temperature and the period of microwave heating. The invention is applicable especially to the control of the sterilization of a pharmaceutical or agri-foodstuff product.

10 Claims, 2 Drawing Sheets

5,464,968

DEVICE FOR THE CONTROL AND DETECTION OF ADEQUATE HEAT LEVELS IN MICROWAVE OVENS

FIELD OF THE INVENTION

The present invention relates to a process and a device for control of the microwave heating of a product to a temperature higher than or equal to a determined temperature for a period longer than or equal to a determined period, a marking support and a receptacle for a product intended for such a control.

It finds its particularly wide, though non-exclusive, application in the field of the control of the sterilization of a product, for example of a solution capable of being injected into an animal or man.

BACKGROUND OF THE INVENTION

Processes for batchwise sterilization of a product in an autoclave are known at present.

Such a sterilization is performed under pressure, for example 3 bar, and consists in heating the receptacles containing the product to be sterilized to of the order of 120° C. for 10 to 30 minutes.

Such processes have disadvantages. They do not permit easy continuous operation. Once the products are sterilized and then conveyed towards their destinations, no subsequent control can be performed in the event of doubt concerning the sterilization of said products.

The present invention is aimed at providing a process, a device, a marking support and a receptacle for product to be controlled corresponding better than those previously known to the requirements of the practice, especially insofar as it permits a true dosimetric control proving that the product has been heated to a temperature exceeding a determined threshold temperature, for example of the order of 120° C., for a period longer than a determined threshold period, for example twenty minutes, and does this with extreme ease; the control can be performed at any time by an operator who is not specially qualified, with the aid of a simple ohmmeter.

To do this, the invention starts with the idea of employing microwave energy, on the one hand for rapidly and homogeneously heating the product and, on the other hand, for varying the conductivity of a thermally crosslinkable ink with which the product or the receptacle containing the product to be heated has been previously marked.

The inventors have, in fact, had the idea of employing the process of crosslinking under microwaves of inks of the polymeric type which are filled with conductive particles like metal powders or fibers such as silver, copper, iron, manganese, ruthenium, rhenium, rhodium, nickel, aluminum or like carbon black, by converting an insulating product into conductive product, to make it act as a dosimeter, in order to control the sterilization of a product, and especially of an injectable solution.

SUMMARY OF THE INVENTION

To this end the invention proposes essentially a process for control of the microwave heating of a product to a temperature higher than or equal to a determined temperature for a period longer than or equal to a determined period, in which the resistivity of a thermally crosslinkable ink filled with conductive particles with which the product or the receptacle containing said product has been marked beforehand is measured, and the resistivity of which is arranged to decrease in relation to the temperature and the period of microwave heating in a predetermined manner, so that the measurement of said resistivity after heating makes it possible to verify the heating of said product to said temperature which is higher than or equal to the determined temperature for said period which is longer than or equal to the determined period.

DESCRIPTION OF THE PREFERRED EMBODIMENTS

Figure 1:
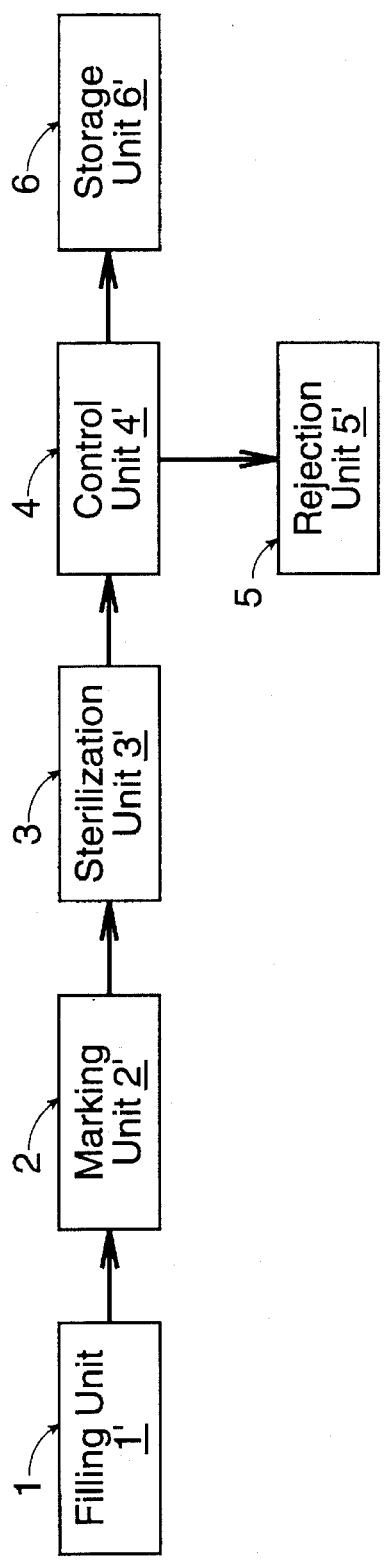
FIG. 1 shows the components of the device used in practicing the process of the invention.

In advantageous embodiments, furthermore, either or both of the following arrangements is (are) used:

- the process comprises the stage of preliminary marking of the product or of its receptacle, said marking consisting in attaching to the product or its support a dielectric support tablet on the upper face of which the thermally crosslinkable ink has been deposited;
- the product to be controlled being contained in a receptacle, the preliminary marking stage consists in marking the receptacle directly with a layer of said thermally crosslinkable ink by silk-screen printing.

The invention also proposes a marking support for controlling the microwave heating of a product to a temperature higher than or equal to a determined temperature, for a period longer than or equal to a determined period, said marking support comprising a support tablet consisting of a dielectric material one face of which comprises an absorbent material and is capable of being attached to said product or to a receptacle capable of containing said product and the other face of which is provided with a layer of thermally crosslinkable ink, filled with conductive particles, the resistivity of said ink being arranged to decrease in relation to the temperature and the period of microwave heating in a predetermined manner, with the result that the measurement of said resistivity after heating makes it possible to verify the heating of said product to said temperature which is higher than or equal to the determined temperature for said period which is longer than or equal to the determined period.

An absorbent material is to be understood to mean any material which is a conductor of electricity, such as metals or a carbonaceous product, arranged as a thin layer (10 to 100 µm).

In another advantageous embodiment the marking support tablet-does not comprise any absorbent material on its face-which is adhesively coated with the product or the receptacle capable of containing it, the product itself then acting as the absorbent material, which can be the case especially when a liquid is involved.

Such supports can be manufactured independently of the products whose subsequent control they will make possible.

The marking support advantageously consists of the receptacle itself, which comprises an enclosure for retaining said product, said enclosure being directly marked externally with the thermally crosslinkable ink.

The invention also proposes a receptacle for product intended to be sterilized or pasteurized by microwave heating, said receptacle comprising an enclosure for retaining said product, which is directly marked externally, or indirectly on an intermediate support, using a thermally crosslinkable ink filled with conductive particles, the resistivity of said ink being arranged in order to decrease in relation to the temperature and the period of microwave heating in a predetermined manner, with the result that the measurement of said resistivity after heating makes it possible to verify the sterilization or pasteurization of said product, filled with conductive particles, the resistivity of said ink being arranged to decrease in relation to the temperature and the period of microwave heating in a predetermined manner, with the result that the measurement of said resistivity after heating makes it possible to verify the sterilization of said product placed in said enclosure.

The product advantageously cannot be dissociated from its packaging without this being detectable.

In fact, and for example, the receptacle is designed as being tamperproof, that is to say that it cannot be opened without such an opening being detectable.

In an advantageous embodiment the product consists of a solution which can be injected into man or animal, or else is an agri-foodstuff product.

An agri-foodstuff product should in particular and for example be understood to mean a product of the cooked dish type, but also fresh vegetables and the like.

The receptacle may, for example, be provided made of glass, the microwave power density used for sterilizing being 70 w/dm$_3$. In another embodiment the receptacle is made of plastic and comprises a jacket in intimate contact with the receptacle containing the product in order to ensure good heat conduction.

The conductive ink is advantageously based on solvent-free plasticized phenolic resole to which butyl carbitol has been added to facilitate the silk-screen printing.

The invention also proposes a device for making use of the process for controlling the heating of product described above.

The invention will be better understood on reading the description which follows, of a number of examples of embodiment, which are applied to the sterilization of solution and are given without any limitation being implied.

The description refers to the drawings which accompany it, in which:

FIG. 1 gives the stages of the process or the components of a device making use of said process, according to one embodiment of the invention.

Figure 2:
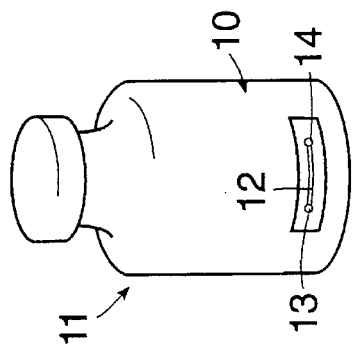
FIG. 2 shows a receptacle marked by silk screen printing.

FIG. 2 shows a receptacle for solution marked by silk-screen printing for control according to the invention.

Figure 3:
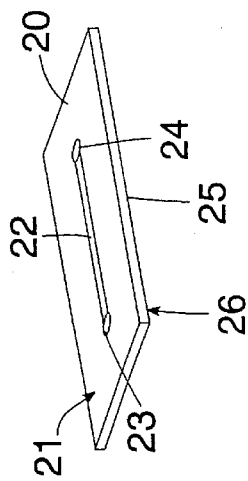
FIG. 3 shows a removable support for marking the product, according to the invention.

FIG. 3 shows a removable support for marking product, for example of the agri-foodstuff type, according to the invention.

FIGS. 4 to 7 are graphs respectively showing the change in the resistance of four different inks (A, B, C and D) which can be applied to the invention, as a function of the period of heating to a temperature higher than of the order of 120° C.

FIG. 1 shows diagrammatically the stages of a process, or the units of a device making use of the process, according to the embodiment of the invention which is described more particularly here applied to the sterilization of glass flasks of injectable solution.

The process is also applicable to solutions placed in plastic pouches with two superposed walls, one corresponding to the receptacle actually containing the solution, and the other to a protective overpackaging. The two enclosures are kept in intimate contact with one another, to permit good transmission of heat by conduction between solution and outer wall of the pouch.

Such a jacketed pouch is obtained in a manner which is known per se, for example by employing a vacuum application technique.

The first stage 1 is a filling stage which allows an automatic filling of the flasks one after another, or in rows of a number of flasks, with the solution to be sterilized in a filling unit 1'.

This may be, for example, a solution of the 5% glucose type.

Each receptacle is then conveyed, with or without intermediate storage, towards the marking unit 2', for a marking stage, which consists in marking the receptacles by silk-screen printing in a manner which is known per se, with a film of thermally crosslinkable ink.

To do this, a layer of line of ink 12 of small thickness, of the order of 20 μm, is deposited (see FIG. 2) on the outer wall 10 of the receptacle 11, for example over a length of one centimeter and a width of the order of a millimeter, between two studs 13 and 14 which will be used as points of contact with the control instrument (ohmmeter) during a measurement.

The two studs are, for example and quite simply, the ends of the layer of ink.

The composition of the ink is, for example, that described below under the heading ink D.

The solution-filled flasks are next closed again in a known manner and then conveyed towards the unit 3' for continuous microwave sterilization 3.

This unit comprises a cavity for processing the products in a flask for a determined period of known type.

The enclosure is kept at a pressure of the order of 3 bar for 12 minutes.

The microwave frequency range employed is advantageously between approximately 0.1 GHz and approximately 100 GHz, preferably between approximately 0.5 GHz and approximately 30 GHz.

Once the sterilization treatment has been performed, the flasks are conducted to the control unit 4' using automatic electrical measurement 4 of the resistance of the ink layer 12 between the studs 13 and 14, by means of an ohmmeter.

By virtue of the invention such a control can be performed flask by flask and not by sampling as in the prior art, with all the risks that this involved.

The nonconforming flasks are automatically rejected towards the unit 5' for rejection 5.

The flasks which have successfully passed the sterilization test are automatically directed towards a unit 6' for storage 6 before use.

FIG. 3 shows a support according to the invention comprising a tablet 20 made of dielectric material, for example made of epoxy glass of thicknesses varying between 8 and 35 microns, the face 21 of which is provided with a layer of thermally crosslinkable ink 22 according to the invention, deposited by silk-screen printing with two conductive studs 23 and 24, of the order of 20 μm in thickness. The other face 25 comprises a layer of absorbent material 26 which acts as attenuator, for example made of carbon, and means for fastening said face 25, for example by adhesive bonding, to a receptacle intended for the product to be controlled, or even directly to the product.

The layer 26 makes it possible to avoid the untimely heating of the ink layer.

It is calculated and produced as a function of the product to be treated and of the conditions to be adhered to in a known manner, within the scope of the person skilled in the art.

This layer of absorbent material may not even be necessary in the case where the product itself acts as attenuator preventing the heating.

It is recalled here, for memory and relating to the measurements of the resistivity of a product formed into a sheet, that the electrical conduction characteristic of a conductive or resistive layer deposited by silkscreen printing can be expressed in ohms per square unit of area of a layer of constant thickness (for example 25 μm in thickness), the electrical resistance of such a square unit being proportional to the resistivity of the material whatever the area of the layer.

This characteristic is conventionally employed by a person skilled in the art.

In the field of electronics there are at present in existence inks of conductive nature, consisting of a binder (for example a thermoplastic or heat-curable polymer) and of a filler (of the silver flake type) which make it possible to produce printed circuits or flat keyboards imparting the appropriate electrical properties to the required circuit.

Let us recall that, before crosslinking, the ink filled with electrically conductive particles is insulating whereas, after crosslinking, it becomes conductive, its electrical conductivity increasing when the cross-linking period increases, to reach a limiting value.

The idea of the invention consists especially in applying the thermal crosslinking of the inks to validate the sterilization or the pasteurization of pharmaceutical or agri-foodstuff products.

No currently known ink can be employed as a sterilization dosimeter.

In fact, no investigation has ever been carried out hitherto into ink whose crosslinking kinetics correspond to the periods and temperatures of correct sterilization of products such as, for example, injectable solutions.

One of the merits of the invention is precisely to propose such inks and, more generally, to detail the manner of obtaining them, inks whose crosslinking kinetics are similar to a sterilization cycle of products under microwaves and, for example, of injectable solutions in glass flasks.

It is self-evident that, as a function of the required application, depending on the following parameters:

product to be sterilized or heated, support employed, power of the microwaves employed, temperature to be reached, period of holding at said temperature, load in the microwave applicator, a person skilled in the art will be capable of determining the composition of the ink to be adopted.

However, the concept of completion of crosslinking of the inks based on thermoplastic or heatcurable resin epoxy, alkyd melamine or acrylic melamine resins is a relative datum. In fact, whatever the method of treatment (microwave or thermal), there always remain reactive sites which have not reacted and the crosslinking can therefore develop as a function of the period-temperature pair. Consequently, the inventors have been led to find the best criterion of good crosslinking of an ink.

By a thermal route, experiment has shown that after 5 hours at 150° C. the mean resistivity of the circuit stabilizes around a value R, the latter could subsequently decrease by 0.1 R in the case of an additional treatment of 5 hours at 150° C.

This 10% variation also corresponds to the accuracy which can be expected from a printing method using silk-screen printing.

In practice, therefore, the inks to be tested are thus standardized in an oven at 150° C. for 5 hours.

The investigation of thermally crosslinkable inks and the determination of an optimized ink, as applied to the sterilization of injectable solution in glass flasks will be now described by way of example, no limitation of any kind being implied.

APPLICATION OF THE INKS

The inks were silk-screen printed manually by means of a 140-mesh polyester screen. The test vehicle was designed specially to be silk-screen printed on adhesive tape known under the name of Kapton, 19 mm in width. This test vehicle is represented by a 100 □ circuit 1 mm in width for measuring resistivity.

This test vehicle is then simply adhesively bonded onto ½-liter glass flasks filled with injectable solution.

MICROWAVE APPARATUS

The microwave equipment used comprises 4 pressure-resistant glass tubes, for example made of glass known under the name "Pyrex", in which a pressure of 2 to 3 bars can be established with the aid of a compression and decompression air-lock. Each tube comprises 5 applicators known under the name Stereomode and manufactured by the French company M.E.S., each powered by an 800-watt generator.

Each applicator can receive 2½-liter flasks. 10 flasks per tube can thus be treated at each sterilization cycle.

To speed up the cooling of the flasks the apparatus is equipped with forced air circulation with a heat exchanger.

EXPERIMENTAL RESULTS FOR VARIOUS INKS

Ink A

This is a thermoplastic conductive ink based on polyester of high molecular weight, manufactured by the German company Hüls.

As in the case of all thermoplastic resins, the ink resistivity decreases in line with the evaporation of the solvents to reach a limiting value which approaches asymptotically the resistivity of the silver-filled resin.

It is therefore a matter of finding the solvent equilibrium which makes it possible to combine, on the one hand, a good stability on the screen and, on the other hand, evaporation kinetics matching the sterilization cycle.

Among the inks that were investigated, a more particular study was made of the silver ink AG C31 from the French company Comptoir Lyon Alemand Louyot (CLAL) (ink A).

The composition of ink A is the following:—

| | |
|---|---|
| 70% | Ag JV4 flakes (mean diam. of the silver particles of the order of 3 μm) |
| 30% | polyester binder at a concentration of |
| | 35% in carbitol acetate |
| 100% | |

Expression of the results for ink A (see FIG. 4):

| Time, min | Resistivity of the circuit in Ω |
| --- | --- |
| 2 | 188 |
| 4 | 66 |
| 5 | 48 |
| 6 | 39 |
| 7 | 32 |
| 8 | 30 |
| 9 | 24 |
| 10 | 23 |
| 11 | 18 |
| 12 | 17 |
| +30 min in the 150° oven | 13 |
| +60 min in the 150° C. oven* | 11 |

Note
*In practice, an additional treatment of 1 h in an oven at 150° C. corresponds to the heat treatment of the same ink in the oven for 5 hours at a temperature of 150° C.

Ink B

To obtain a better reactivity under microwaves, binders based on water-soluble polyester resins were employed next.

These resins, directly soluble in water without any neutralizing amine, then appeared to offer a major advantage for the reactivity under microwaves.

For example, the product known under the name Hydrorob 101100 from the Robbe company was employed to advantage.

Its characteristics are the following:

| Solids content | 80% ± 1% |
| --- | --- |
| Solvent | Butyl glycol |
| Hydroxyl value | 280–320 |

Different binders were studied by starting with this resin, one comprising a certain proportion of water, the other without the presence of water, containing only solvents of high polarity. Butyl glycol with an evaporation value of 163 was finally chosen as base solvent. Butyl diglycol with a higher evaporation value was adopted as tension solvent.

| Binder 1 | | Ink B No. 1 | |
| --- | --- | --- | --- |
| 80% water-soluble polyester | 25 | 75% Silver JV7 | |
| Methylated urea formaldehyde resin | 60 | 20% Binder 1 | |
| Butyldiglycol | 5 | 5% Butylglycol | |
| Water | 5 | | |
| Butyl glycol | 4.5 | 100% | |
| Blocked PTSA catalyst | 0.5 | | |
| | 100% | | |

| Binder 2 | | Ink B No. 2 | |
| --- | --- | --- | --- |
| 80% water-soluble polyester | 25 | 75% Silver JV7 | |
| Methylated urea formaldehyde resin | 60 | 21% Binder 2 | |
| Butyldiglycol | 5 | 2% Butylglycol | |
| Butyl glycol | 9.5 | 2% Butyldiglycol | |
| Blocked PTSA catalyst | 0.5 | | |
| | 100% | | |

The difficulty of storing inks based on resins (water-soluble polyester/amino resins/catalyzed with blocked PTSA) makes it necessary to keep these inks at temperatures of the order of maximum 10° C. To circumvent this difficulty the inventors have been led to employ much more reactive amino resins, which resulted in ink B No. 3.

| Binder 3 | | Ink B No. 3 | |
| --- | --- | --- | --- |
| Hydrorob 101100 | 15 | 75% Silver flake JV7 | |
| HMM 066 (BASF) | 40 | 21% Binder 3 | |
| Butyldiglycol | 18 | 2% Butyl glycol | |
| Butyl glycol | 18 | 1.9% Ethyl glycol acetate | |
| Ethyl glycol acetate | 8 | 0.1% Byk 052 (antibubble) | |
| | 100% | 100% | |

Expression of the results for ink B (see FIG. 5):

| Time, min | Resistivity of the circuit in Ω |
| --- | --- |
| 1 | 250 |
| 2 | 111 |
| 3 | 43 |
| 4 | 25 |
| 5 | 18 |
| 6 | 16 |
| 7 | 16 |
| 8 | 15 |
| 9 | 13 |
| 10 | 13 |
| 11 | 12 |
| 12 | 10 |
| +30 min in the 150°oven | 9 |
| +60 min in the 150°oven | 9 |

Although satisfactory overall, ink B nevertheless has the disadvantage of a very high hydroxyl value of the resin, of the order of 300; it is therefore necessary to employ a high proportion of amino plastic needed for the crosslinking, resulting in a risk of loss of the film flexibility.

Ink C

Ink C is an ink based on heat-curable acrylic resin (ref. Plexisol DV 606 from the German company Röhm).

| Binder 4 | | Ink C | |
| --- | --- | --- | --- |
| Plexisol DV 606 | 68 | 70% Silver XRP 5 | |
| Methylated melamine resin of high reactivity | 10 | 30% Binder 4 | |
| Butyl glycol | 9 | | |
| Butyl carbitol acetate | 9 | 100% | |
| Butyldiglycol | 4 | | |
| | 100% | | |

Expression of the results for ink C (see FIG. 6):

| Time, min | Resistivity of the circuit in Ω |
|---|---|
| 3 | 169 |
| 4 | 73 |
| 5 | 56 |
| 6 | 49 |
| 7 | 40 |
| 8 | 35 |
| 9 | 30 |
| 10 | 23 |
| 11 | 18 |
| 12 | 15 |
| +30 min in the 150° oven | 10 |
| +60 min in the 150° oven | 9 |

Ink D

Ink D is a conductive ink (ref. VF 53 from CLAL) based on imprenal 31A from the Rashig company.

Imprenal 31A is a solvent-free plasticized phenolic resole.

After curing the films exhibit a high resistance to chemical products, to solvents, to acids, to bases and to oxidizing agents.

Ink D is compatible with epoxies and vinyl, acrylic amino plastic polyester resins.

| Composition of the ink D | |
|---|---|
| 63% | Silver JV5 (as Flake) |
| 17.3% | Imprenal 31A |
| 6.5% | Butyl carbitol |
| 13.2% | Methyl cyclohexanol |
| 100% | |

However, the wettability of the pigment filler is mediocre and results in an imperfect ink rheology, the deposits being nonuniform in appearance.

An addition of butyl carbitol makes it possible to make the ink fit for silk-screen printing with good reproducibility.

Figure 7:
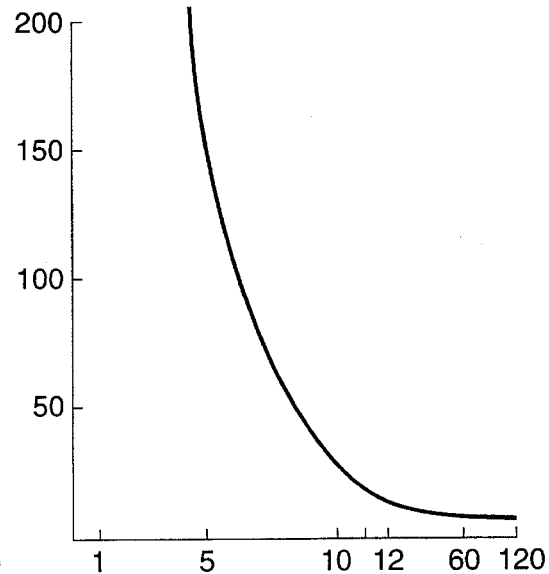

Expression of the results for ink D (see FIG. 7)

| Time, min | Resistivity of the circuit in Ω |
|---|---|
| 4 | 231.5 |
| 5 | 131.8 |
| 6 | 90.5 |
| 7 | 67.3 |
| 8 | 51.7 |
| 9 | 39.1 |
| 10 | 28.2 |
| 11 | 16.0 |
| 12 | 11.2 |
| +30 min in the 150° oven | 9.6 |
| +60 min in the 150° oven | 8.7 |

INTERPRETATION OF THE RESULTS

The inventors subsequently reduced the possibility of final exploitation of these results to two parameters:

on the one hand, the change in slope of the conductivity curve as a function of the period of microwave treatment. The sensitivity of the method will, in fact, be proportionally higher the greater the change in slope in the vicinity of the end of the microwave treatment cycle (12 minutes in the case of a power of 800 W and ½-liter flasks in the example more particularly described here);

on the other hand, the stability of the conductivity curve after the end of the cycle, to permit long-term sterilization checks.

One of the merits of the inventors has been to decide the choice of the inks from their crosslinking curve while being guided by the optimization of these 2 parameters.

It is obvious that this method, described more particularly with reference to the sterilization of flasks of solution, is, of course, similarly applicable to the investigation and the optimization of the thermally crosslinkable ink which would be intended for heating another product and/or another receptacle.

The following table has been established so as to make it possible to compare the results between the inks:

|  | Ink A | Ink B | Ink C | Ink D |
|---|---|---|---|---|
| R (Ω) | 18.5 | 12.1 | 18.26 | 16.02 |
| R' (Ω) | 17.5 | 10.4 | 15.5 | 11.2 |
| R" (Ω) | 11 | 9.0 | 9.3 | 8.7 |
| $\Delta_1$ | −5.4 | −14.0 | −14.8 | −30.0 |
| $\Delta_2$ | −37.1 | −13.5 | −40.0 | −22.3 | with:

R: resistance of the ink in Ω after 11 minutes under microwaves;

R': resistance of the ink in Ω after one 12-minute sterilization cycle;

R": resistance of the ink in Ω after a second 12-minute sterilization cycle.

$$\Delta_1 = \frac{R'-R}{R} \times 100 \quad \text{and} \quad \Delta_2 = \frac{R''-R'}{R'} \times 100$$

Bearing in mind what has been stated above, the optimum dosimeter ink must give a maximum change in its resistivity between 11 and 12 minutes (corresponding to the sterilization period), and must give as little change as possible in its resistivity after the end of the cycle, for example less than 10 or 20%.

From the above table it is therefore concluded that ink D fulfills best the conditions determined by the inventors, since it exhibits a change of the order of 30% between 11 and 12 minutes and since the change in resistivity with time is of the order of 20%.

Figure 4:
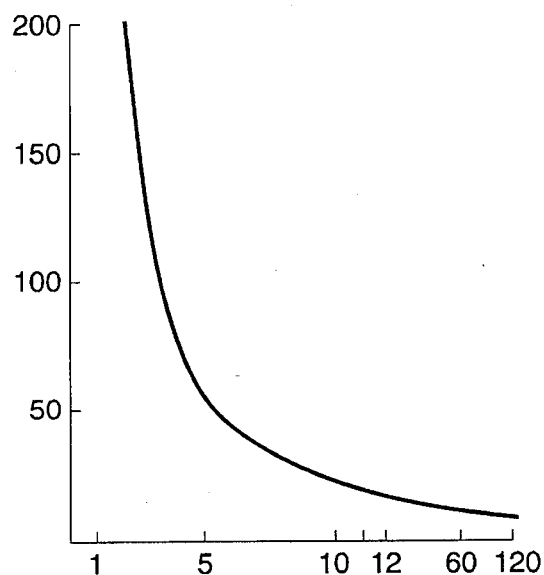
FIGS. 4, 5, 6 and 7 are graphs showing the change in resistance for four different inks which can be used according to the invention.
Figure 5:
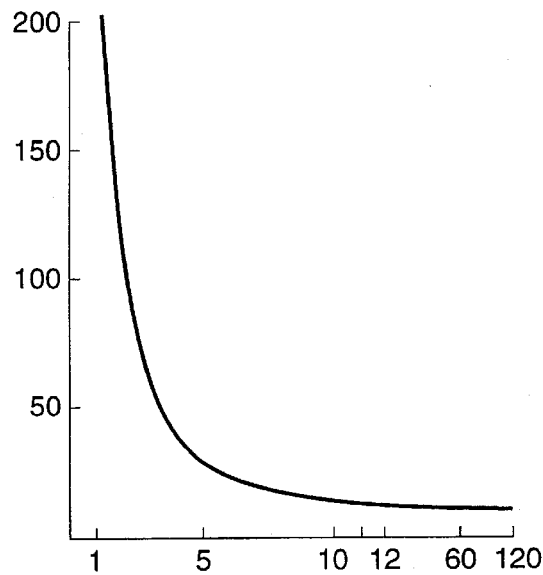
Figure 6:
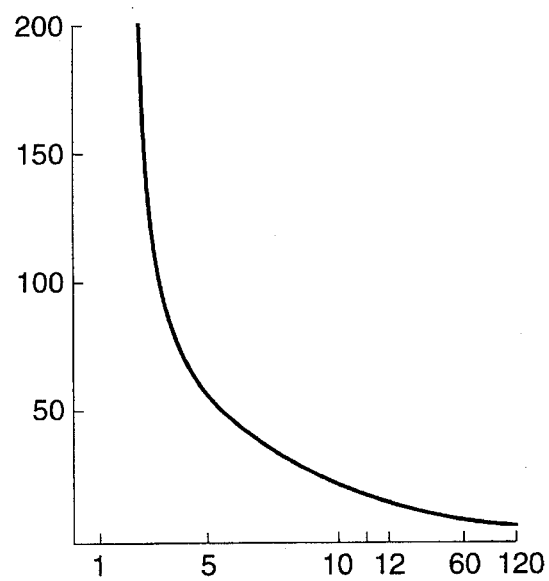

The crosslinking kinetics of ink D therefore constitute a good compromise between a sufficiently rapid change at the end of the sterilization cycle and a correct stability after the end of the cycle, as follows, furthermore, from the inspection of FIG. 7, when compared with FIGS. 4 to 6.

Let us note, however, that inks A, B and C, while less optimized for the present application, also exhibit acceptable results, making it possible to meet the criteria of the invention.

This choice of ink therefore permits:

immediate verifications of a proper sterilization of the flask by measurement of the electrical resistance of the test circuit as soon as the sterilization ends;

subsequent, and especially very long term verifications of the sterilization of the flask, whatever its geographical location, insofar as a value of resistance which is lower than 20 Ω is impossible to obtain without the flask having been treated with microwaves in appropriate conditions.

However, the chosen ink formulation necessarily demands that the following parameters be taken into account:

1) The sterilization must be done using microwaves and not using steam or another thermal means.
2) The flask must be full of solution (whatever its kind) because the kinetics would be different with an empty flask.
3) The nature of the container is important. The formulation made up for a glass flask must therefore be more or less adjusted in the case of, for example, a plastic pouch package.
4) The rate of sterilization is a function of the microwave power density used. The use of 2 kW instead of 0.8 kW generators would therefore result in a reformulation of the ink in order to readjust the crosslinking and sterilization kinetics.

Such adjustments are within the competence of a person skilled in the art, especially when employing the optimization method developed by the inventors.

Once again, one of the chief advantages of a process according to the invention is to permit the individual and continuous control of the state of sterilization of the products by measurement of an electrical resistance, with the possibility of automatic rejection of dubious flasks, for example at the end of the treatment.

It also permits a second on-site check using an ohmmeter, especially just before the flask is used, this providing the user with a high degree of safety.

We claim:

1. A process for controlling microwave heating of a product to a temperature higher than or equal to a determined temperature for a period longer than or equal to a determined time, which comprises the steps of
   a. marking the product or a receptacle containing said product with a thermally crosslinkable ink comprising conductive particles whose resistivity decreases in predetermined manner in relation to the determined temperature and the determined period of heating for said product,
   b. microwave heating the marked product or receptacle to the determined temperature or to a temperature higher than the determined temperature for a period time equal to or longer than the determined time,
   c. measuring the resistivity of the crosslinkable ink to verify that the product has been heated to a sufficient temperature for a sufficient period of time.

2. A process according to claim 1 in which the product or the receptacle containing said product is marked by attaching thereto a di-electric support tablet on the upper face of which the thermally crosslinkable ink has been deposited.

3. A process according to claim 1 in which the product is contained in a receptacle and said receptacle is marked by silk screened printing thereon of the thermally crosslinkable ink.

4. A process for controlling sterilization of a product, which comprises the steps of
   a. marking the product or a receptacle containing said product with a thermally crosslinkable ink comprising conductive particles whose resistivity decreases in predetermined manner in relation to a determined temperature and a determined period of time required for sterilization of said product,
   b. microwave heating the marked product or receptacle to the determined temperature or to a temperature higher than the determined temperature for a period of time equal to or longer than the determined time, and
   c. measuring the resistivity of the crosslinkable ink to verify that the product has been heated to a sufficient temperature for a sufficient period of time.

5. A process for controlling the sterilization or pasteurization of a liquid product which comprises the steps of
   a. marking a receptacle containing the product with a thermally crosslinkable ink comprising conductive particles whose resistivity decreases in predetermined manner in relation to a determined temperature and a determined period of time required for sterilization or pasteurization of said product,
   b. microwave heating the marked receptacle to the determined temperature or to a temperature higher than the determined temperature for a period of time equal to or longer than the determined time, and
   c. measuring the resistivity of the crosslinkable ink to verify that the product has been heated to a sufficient temperature for a sufficient period of time.

6. A di-electric marking support tablet for controlling the microwave heating of a product to a temperature which is higher than or equal to a determined temperature for a period which is longer than or equal to a determined period, said support tablet comprising one face which is capable of being attached to said product directly or to a receptacle containing said product, and another face which is provided with a layer of thermally crosslinkable ink filled with conductive particles, said ink chosen so that its resistivity decreases in predetermined manner in relation to the temperature and the time period of microwave heating, whereby measurement of said resistivity after heating makes it possible to verify the heating of said product to a temperature which is higher than or equal to the determined temperature and for a period which is longer than or equal to the determined period.

7. A marking support tablet according to claim 6 in which the face capable of being attached to the product or to a receptacle containing said product comprises an absorbent material.

8. A marking support tablet according to claim 7 in which the conductive ink is based on solvent free plasticized phenolic resole to which butyl carbitol has been added.

9. A receptacle for a product intended to be sterilized or pasteurized by microwave heating, which is externally marked, directly or indirectly on an intermediate support, with a thermally crosslinkable ink filled with conductive particles, said ink having been chosen so that its resistivity decreases in a predetermined manner in relation to a determined temperature and a determined time period of microwave heating, whereby measurement of said resistivity after heating makes it possible to verify the sterilization or pasteurization of said product.

10. A receptacle according to claim 9 in which the conductive ink is based on solvent-free plasticized phenolic resole to which butyl carbitol has been added.

* * * * *